(12) United States Patent
Kimberg

(10) Patent No.: US 8,967,946 B2
(45) Date of Patent: Mar. 3, 2015

(54) MODULAR WIND-SOLAR ENERGY CONVERTING ASSEMBLY

(76) Inventor: Serge Kimberg, Toronto (CA)

( * ) Notice: Subject to any disclaimer, the term of this patent is extended or adjusted under 35 U.S.C. 154(b) by 655 days.

(21) Appl. No.: 13/135,967

(22) Filed: Jul. 18, 2011

(65) Prior Publication Data

US 2012/0025536 A1 Feb. 2, 2012

(30) Foreign Application Priority Data

Jul. 19, 2010 (CA) .................................... 2709723

(51) Int. Cl.
| | |
|---|---|
| *F03D 11/04* | (2006.01) |
| *F03D 9/00* | (2006.01) |
| *F24J 2/52* | (2006.01) |
| *H01L 31/042* | (2014.01) |
| *H02S 10/10* | (2014.01) |

(52) U.S. Cl.
CPC ................. *F03D 9/007* (2013.01); *F24J 2/523* (2013.01); *F24J 2/5232* (2013.01); *F24J 2/5241* (2013.01); *F24J 2/526* (2013.01); *H01L 31/0422* (2013.01); *H01L 31/0583* (2013.01); *F05B 2240/13* (2013.01); *F05B 2240/212* (2013.01); *F05B 2240/213* (2013.01); *F05B 2240/40* (2013.01); *F24J 2002/5284* (2013.01); *Y02E 10/50* (2013.01); *Y02E 10/465* (2013.01); *Y02E 10/47* (2013.01); *Y02E 10/725* (2013.01)
USPC ........................................ 415/4.2; 416/244 R

(58) Field of Classification Search
CPC ......... F03D 9/007; F03D 9/005; F03D 3/005; F03D 3/0409; F05B 2240/212; F05B 2240/213; F05B 2240/40; Y02E 10/50; Y02E 10/725; Y02E 10/74

USPC ............ 415/4.2, 4.4; 416/244 R, 130, 196 A, 416/227 R
See application file for complete search history.

(56) References Cited

U.S. PATENT DOCUMENTS

| | | | | |
|---|---|---|---|---|
| 1,503,061 | A | * | 7/1924 | Pendergast .................... 415/162 |
| 4,551,631 | A | | 11/1985 | Trigilio |
| 5,391,926 | A | * | 2/1995 | Staley et al. .................... 290/55 |
| 7,453,167 | B2 | | 11/2008 | Gilbert |
| 7,525,210 | B2 | | 4/2009 | Fein et al. |
| 7,851,935 | B2 | | 12/2010 | Tsao |
| 2009/0186745 | A1 | | 7/2009 | Lewiston |
| 2010/0183443 | A1 | | 7/2010 | Thorne |
| 2010/0207453 | A1 | | 8/2010 | Ottman |

FOREIGN PATENT DOCUMENTS

| | | |
|---|---|---|
| CN | 101368542 A | 2/2009 |
| CN | 101777774 A | 7/2010 |
| DE | 202004016443 U1 | 3/2005 |
| GB | 2187512 A | 9/1987 |
| GB | 2460389 A | 12/2009 |
| JP | 2005083327 A | 3/2005 |
| KR | 20020078454 A | 10/2002 |
| WO | 2010/083043 A2 | 7/2010 |

* cited by examiner

*Primary Examiner* — Dwayne J White
(74) *Attorney, Agent, or Firm* — Boris Parad

(57) ABSTRACT

A modular wind and solar energy converting and structurally self-supporting assembly including a plurality of conjoined tubular wind turbine modules angularly extendable in different directions and solar panels attachable to said wind turbine modules for joint and sequential energy collection and conversion into electric power.

16 Claims, 7 Drawing Sheets

MODULAR WIND-SOLAR ENERGY CONVERTING ASSEMBLY

FIELD OF THE INVENTION

This invention relates to hybrid electrical power generation systems synergizing and combining renewable energy sources, such as wind kinetic energy and solar radiation.

BACKGROUND OF THE INVENTION

The prior art is replete with various systems combining wind kinetic energy and solar radiation for generating electrical power. One group of such systems discloses wind turbines with the photovoltaic modules or layers being applied to the wind turbine blades, tower, nacelle, shroud, and other components. For example:

US Patent Application Publication US2010/0207453 describes a combination of wind turbine and solar energy collectors, where a solar photovoltaic material is secured to the surface of the wind turbine tower to augment the power generation capability of the wind turbine.

US Patent Application Publication US2010/0183443 discloses a system for collecting wind and solar energy including a tower, wind turbine and solar energy collector having a vertically oriented frame attached to the wind turbine.

U.S. Pat. No. 7,453,167 discloses a wind turbine and solar energy collector where solar panels are mounted on the rotor blades to provide output from the combined energy of the wind turbine and the solar panels.

GB Patent 2460389 teaches a wind turbine that comprises a drum shaped blade rotor with solar panels mounted on the blades;

GB Patent 2187512 suggests a wind turbine rotor with photovoltaic cells for utilization of both wind and solar energy sources.

KR Patent Application 20020078454 describes a hybrid power generating system using wind and solar energy via a solar cell installed on a wind guide surface.

DE Patent 202004016443 discloses a combined wind turbine and solar panel system for generation of electricity that has a tall mast carrying a propeller-type turbine swivelling to face the wind and has solar panels on the south-facing side of the mast.

JP Patent Application 2005083327 teaches a wind channel to which a solar cell module is attached to channel surface, a windmill rotated by an air current passing through the wind channel inside, at an inlet or at an outlet of the wind channel, and a generator driven by the windmill.

The second group of systems includes wind energy devices with relatively small areas of solar collector modules of predominantly horizontal orientation, which are mounted either on a wind turbine itself or on an auxiliary structure that does not incorporate wind turbine, for example a pole or a building. Such standalone devices are not united into a structure with a small footprint and high load bearing capability. Examples of such systems:

U.S. Pat. No. 4,551,631 teaches a wind and solar electric generating plant with a plurality of wind turbine assemblies rotating on a common axis being, a common base and a common roof that has a solar energy collection and conversion system mounted on it.

U.S. Pat. No. 7,851,935 describes an integrated hybrid energy generating system capable of converting wind and solar energy and including a vertical wind turbine with windshield deflector structures incorporating solar collectors of thermo-mechanical engine.

US Patent Application 2009/0186745 describes a horizontal axis wind turbine coupled with a solar panel which are supported by a structure including a roof frame and a plurality of columns supporting that frame.

CN Patent 101777774 discloses a solar energy and wind-powered grid-connected generating system including a solar battery board device mounted on a wind motor tower frame or on a generator set tower barrel fixedly arranged at a certain azimuth angle and an inclination angle, or rotated around the tower barrel axis.

U.S. Pat. No. 7,525,210 reveals a roadway system for energy generation and distribution comprising a plurality of ground-based hybrid solar-wind energy generating devices and a roadway electricity grid.

The third group of systems is characterized by predominantly horizontal orientation of solar collecting elements that are mounted on top of supporting structures incorporating wind turbines. Such systems provide a relatively low energy output from the wind, since the height of the supporting elements and the turbine's wind sweeping area are limited by the load bearing capability of the supporting structures in view of the elevated center of gravity. Solar collector elements positioned on the top of the supporting structure destabilize the structure because of their unprotected wind exposure. Examples of the known art in this group:

CN Patent 101368542 describes a vertical movable vane which mainly comprises a central upright main shaft, a multi-positional square frame, a plurality of movable vanes with equal width or unequal width, an electrical control or mechanical control telescopic silencing a vane retaining pin, a lower generator and a solar energy battery plate arranged on the upper part of the support bracket.

WO Patent Application 2010US00092 20100115 discloses a power generation device including a base, a turbine mounting structure carried by the base and a wind turbine carried by the turbine mounting structure, and may further include a solar cell mounting structure connected to the base and overlying the wind turbine.

U.S. Pat. No. 4,119,863 teaches a structure of the elevated rooftop solar panel array combined with vertical wind turbines supported by the open framework and vertical posts.

However, none of the prior art references of record discloses or teaches the novel design of the modular wind-solar energy converting and self-supporting assembly as disclosed in the subject invention hereinbelow.

SUMMARY OF THE INVENTION

According to the subject invention, a structurally self-supporting modular wind turbine assembly includes a plurality of wind turbine modules being detachably integrated by couplers having different degrees of freedom for angular attachment of modules. Each module comprises a rotating shaft with longitudinally attached blades and a stationary sleeve encompassing that shaft.

The sleeve has top and bottom circular platforms interconnected by a series of equidistantly spaced jambs. The open space windows formed by the stationary jambs allow practically unrestricted access to the wind to blow onto the rotating shaft blades. Couplers connecting the module platforms can be affixed to each other to build the expandable module poles and beams and also angularly attach these beams and poles, thereby creating self-supporting frames of the wind turbine module assembly. The scalable architecture of the modular assembly lends itself to a small and variable geometry footprint of assembly poles, such as octagonal, rhomb or rectangular configurations. A series of the clustered modules forming structural columns or poles can be operatively connected to an electrical generator and mounted on the electrical generator housing.

Solar panels of photovoltaic cells are attachable to the wind module poles or beams via their supporting frames and pre-stressed cables stabilizing the frame positions. The solar panels can be installed horizontally or angularly and secured to either to a few rigidly linked modules or a plurality of module beams and poles. The panels lower the center of gravity of the whole assembly so to provide increased structural stability for the assembly.

The self-supporting assembly's angular and multi-directional expandability affords its installation on the mountainous, substantially flat or other contour surface areas as a standalone or a modular framework extendable in many directions and having a variable geometry footprint.

DETAILED DESCRIPTION OF THE PREFERRED EMBODIMENTS

Figure 1:
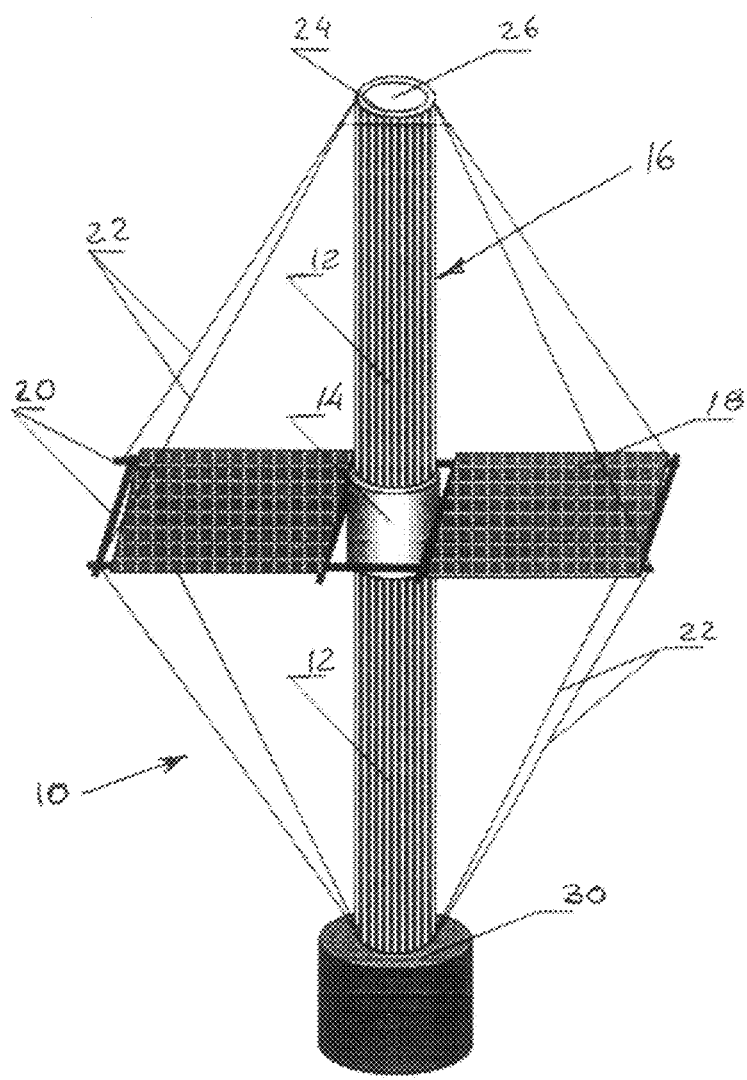
FIG. 1 is 3-D view of one embodiment of a standalone modular assembly consisting of two linearly connected wind turbine modules with an attached frame supporting photovoltaic solar panels.

Referring now to the drawings wherein reference characters designate like or corresponding parts throughout the several views, there is shown in FIG. 1 a modular wind turbine assembly embodiment 10 including a wind turbine module 12, which is rigidly connected to another module by a tubular coupler 14 to form an integrated modular pole 16. Arrays of photovoltaic solar panels 18 are mounted on their supporting frame 20, which is attached to the beam coupler 14 and supported by the wind turbine pole 16.

The vertical pole 16 and substantially horizontal photovoltaic solar panels 18 symmetrically attached to the modular beam at its midsection level are stabilized by pre-stressed brace cables 22, which pull the solar panel frame in opposing directions. Such solar panel frame position lowers the assembly's centre of gravity, increases the stability of the whole assembly, the wind swept area and electrical output of the wind turbines, while keeping the underlying ground area unoccupied.

Each wind turbine module 12 consists of a stationary sleeve 24 coaxially encompassing a rotor 26. The lightweight stationary sleeve 24 withstands vertical, tortuous and horizontal mechanical loads being applied to the module and shields the rotor 26 rotating therein.

Figure 2:
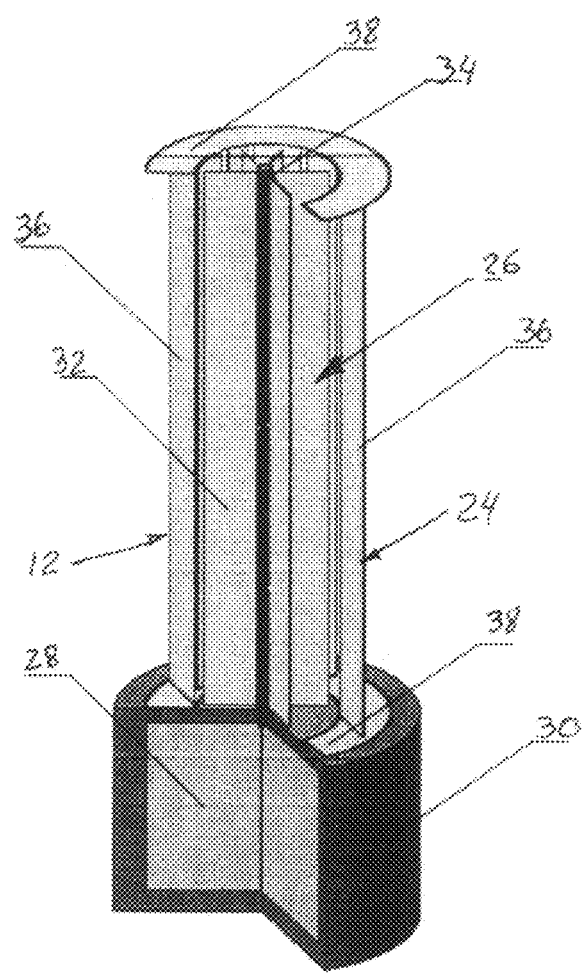
FIG. 2 is a schematic 3-D view of a wind turbine module anchored and based on an electrical generator housing.

FIG. 2 depicts a schematic 3-D view of the standalone module 12 operationally and coaxially connected to an electrical generator 28 mounted on the base 30, which also serves as an electrical generator housing. The housing 30 provides the ground access to and maintenance of said generator 28.

Said module rotor aerodynamically designed for wind-caused optimal spinning effect does not carry any load except its own weight and mechanical stress. Savonius, Darrieus, giromill, spiral-formed, or other types of rotors could be used for module rotors. In the module embodiment shown in FIG. 2, a rotor 26 includes a plurality of blades 32 longitudinally and radially affixed to a central shaft 34, the ends of which should be rigidly secured for the module structure's stiffness and vibration elimination.

The stator or stationary sleeve 24 includes a series of equidistantly and circumferentially spaced jambs 36, which could be made in a shape of rods or plates, rigidly abutting the top and bottom circular platforms 38. The jambs 36 and platforms 38 form the frames for open space windows providing minimally restricted wind access to the rotor's blades 32. The strength, shape and quantity of the sleeve's jambs are defined by the various structural loads on the module while facilitating a minimum aerodynamic drag regardless of wind directions. The shape of longitudinally and radially extending jambs 36 may have flat or curved shapes, and they may be positioned at different angles relative to their radial orientation. The top and bottom traversal platforms 38 may have the shape of squares, discs, cones, toroids, or truncated cones.

The stator's sleeve jambs 36 and module capping platforms 38 shield the rotor's fixed central shaft 34 with longitudinally attached blades from collisions with birds and other flying species. Absence of any vibrating elements in each module eliminates the noise causation that is so notoriously associated with the horizontal axis wind turbines.

Wind turbine modules platforms may be detachably and integrally connected by cylinder or tubular couplers 14 to form a beam, pole, pillar or a chain of such beams, which could be angularly interlocked by multidirectional couplers' joints 40 as shown in FIG. 3A, FIG. 3B, FIG. 3C, FIG. 4A, and FIG. 4 B. Said couplers allow the wind turbine module beams orientation into various positions resulting in a straight line, curvilinear or inclined module string or chain formations, which could be built along the roadways or in the countryside. The multi-directional couplers' joints 40 allow angular and linear connection of modules. One of the unique features of this invention is the expandability of interconnected turbine modules in essentially any direction as well as the ability of modules to operate as a standalone unit.

Figure 3A:
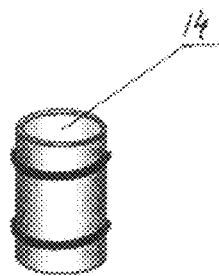
FIG. 3A is a 3-D view of a cylindrical coupler.
Figure 3B:
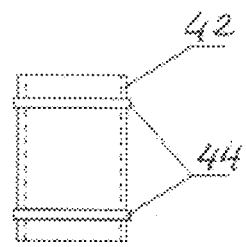
FIG. 3B is a side view of the cylindrical coupler.
Figure 3C:
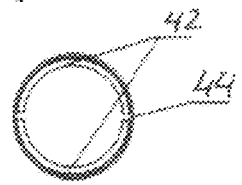
FIG. 3C is a top view of the cylindrical coupler.

A cylinder coupler 14 includes two half tubes 42 that are clamped together by clips 44 as shown in FIG. 3A, FIG. 3B and FIG. 3C which reflect the coupler's 3-D, side and top views, respectively. It should be understood that the internal diameter of said half tubes 42 is complementing the outside diameter of said stators' sleeve 24.

Figure 4A:
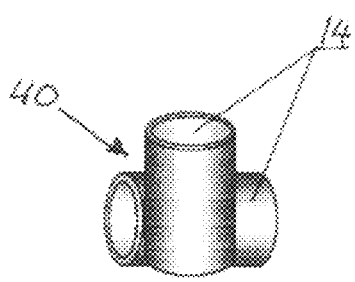
FIG. 4A is a schematic 3-D view of a cylindrical coupler.
Figure 4B:
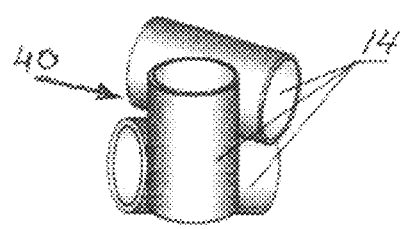
FIG. 4B is a schematic 3-D view of a cylindrical couplers' joint that provides angular connection of turbine modules.

FIG. 4A and FIG. 4B illustrate embodiments of multi-directional couplers' joints 40 angularly and rigidly attaching said cylinder couplers 14 to provide the module connections at predetermined angles.

Figure 5A:
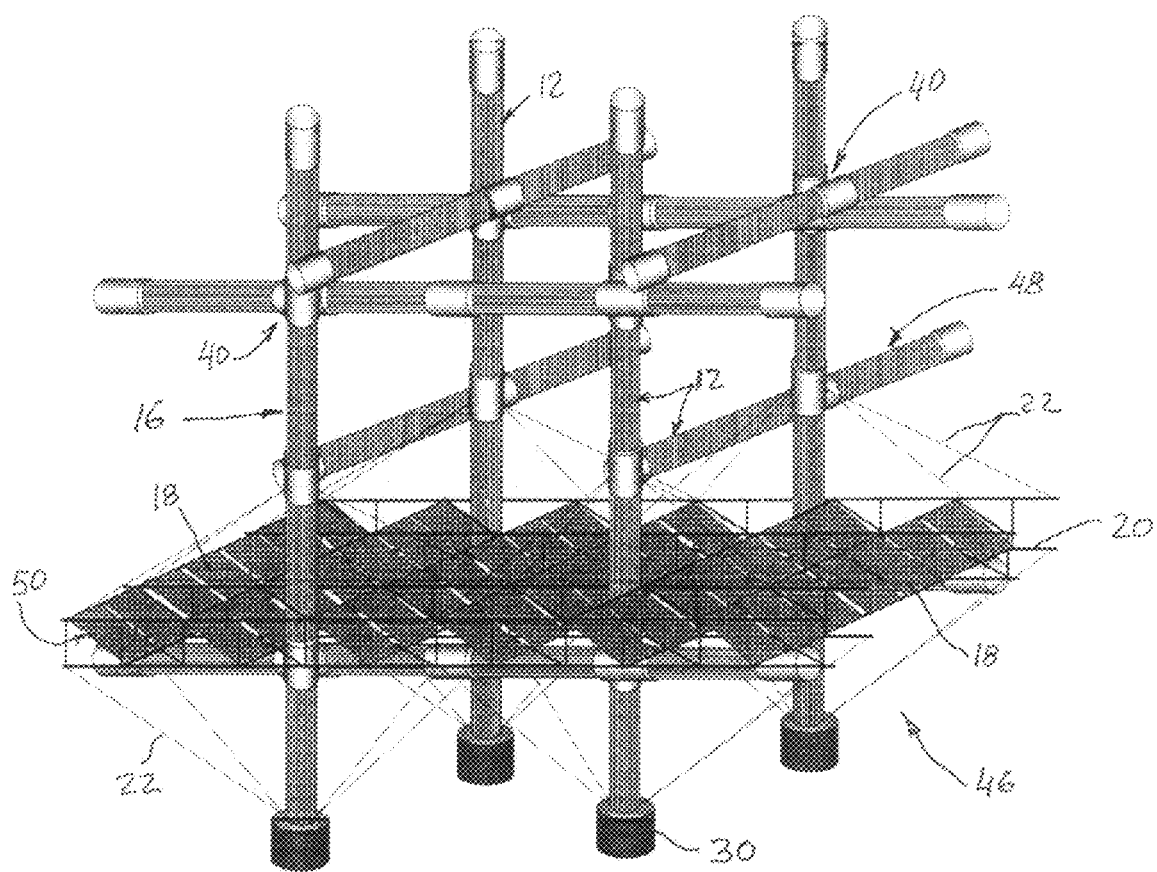
FIG. 5A is a schematic 3-D view of a modular wind turbine assembly comprising a plurality of interconnected wind turbine module beams and a horizontal solar panel frame with angularly positioned solar panel rows.
Figure 5B:
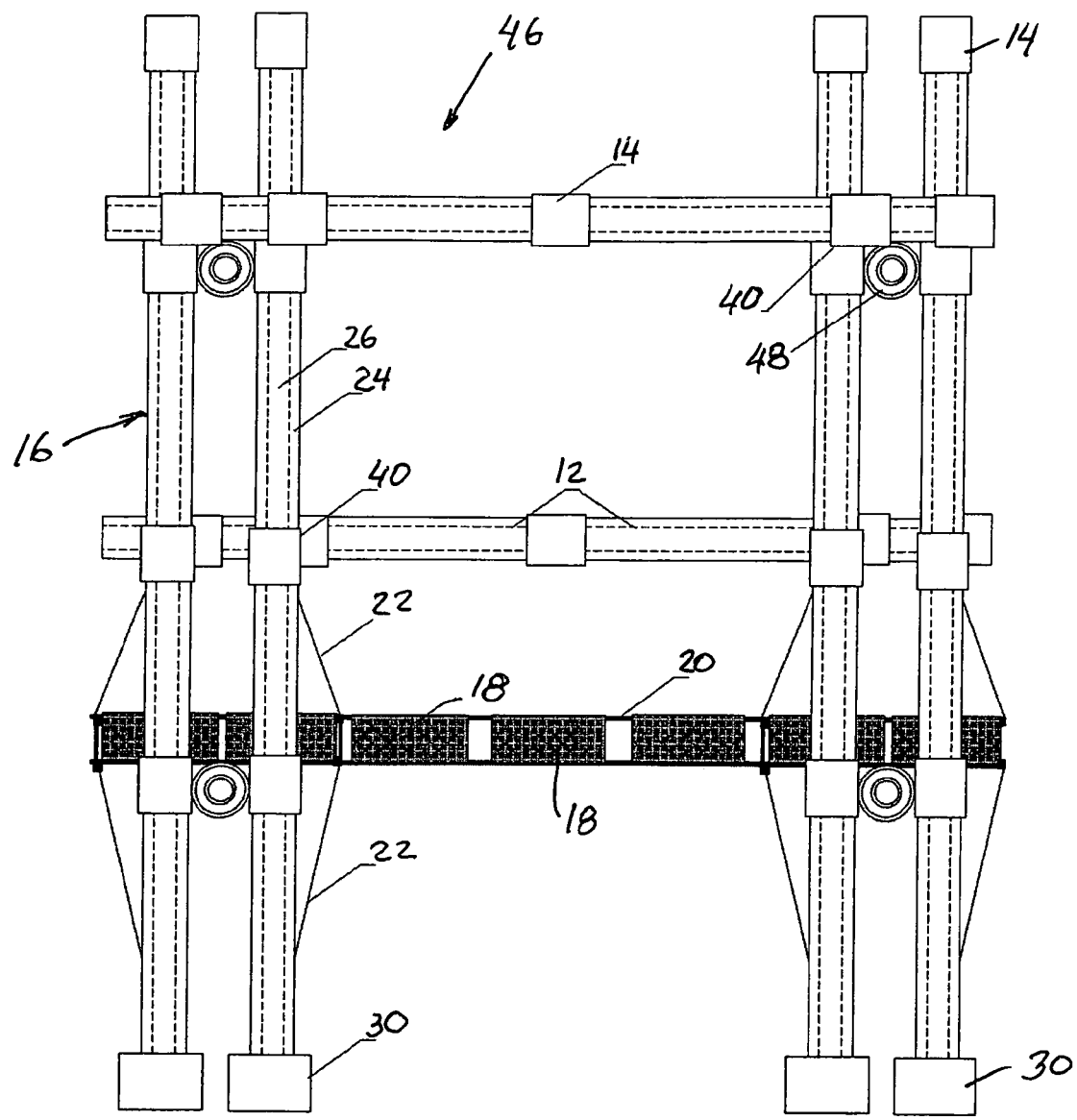
FIG. 5B is a side view of the modular wind-solar energy converting assembly shown in FIG. 5A.
Figure 5C:
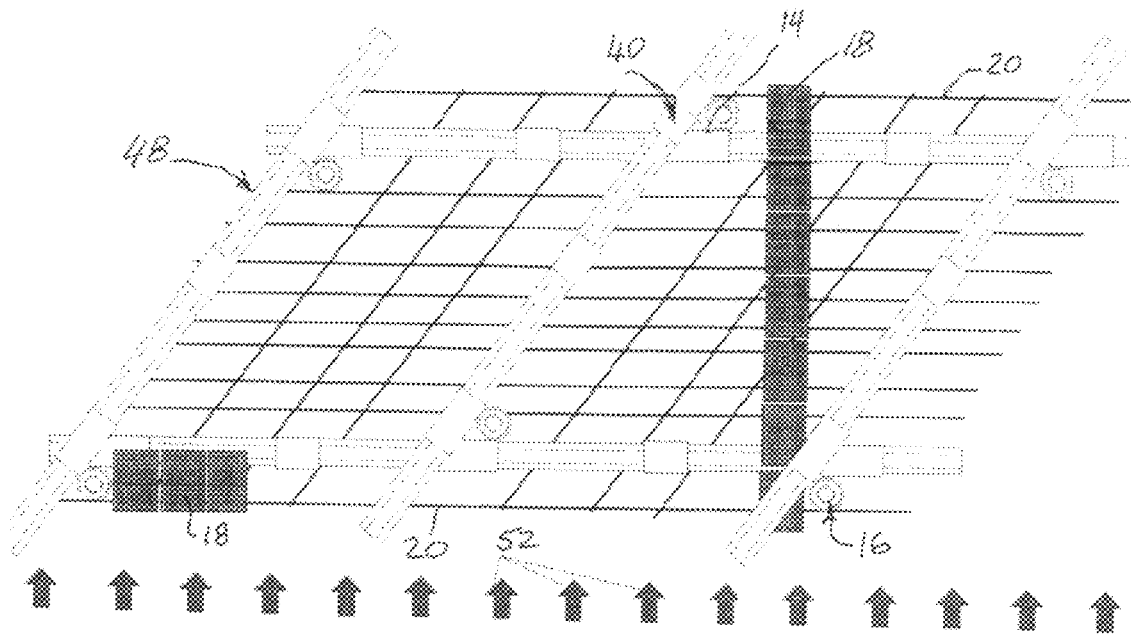
FIG. 5C is a top view of one configuration of possible embodiments of the modular assembly shown in FIG. 5A.

In one of the preferred embodiments, the modular multi-level and multilateral frame assembly 46 may be utilized for power generation in renewable energy farms. Such extendable framework 46 of interlocked module poles 16 and substantially horizontal beams 48 is illustrated in FIG. 5A, FIG. 5B and FIG. 5C, which reflect the framework's 3-D, side and top view, accordingly. The angularly positioned solar panel rows 50 may be mounted on a solar panel supporting framework 20 and occupying the lower level of the multilevel framework 46. For clarity of the framework components' view, only a few photovoltaic solar panels 18 are shown in FIG. 5C.

In order to minimize the solar panel shadowing by the modular turbine framework 46, one of possible embodiment configurations shown in FIG. 5C positions the solar panels in a tight rhombic or diamond shape formation of poles with their bases being normal to the predominant wind direction 52.

Figure 6:
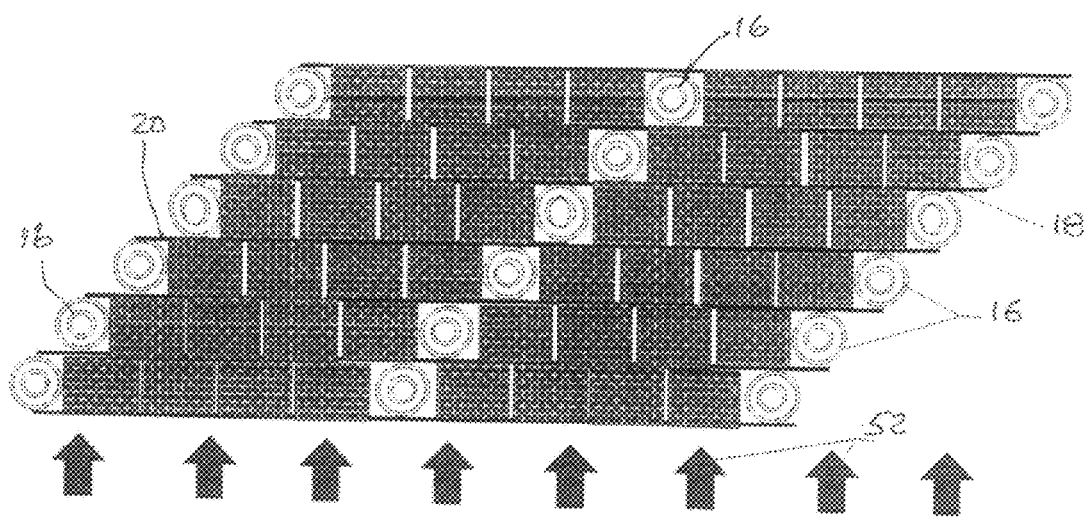
FIG. 6 is a top view of another configuration variation of the embodiment of the modular assembly showing the high density of wind turbines per unit area.

The turbine modules placed in close proximity to each other result in high turbine density, and consequent more efficient use of the land and wind energy, as illustrated in FIG. 6. Wind turbine modules positioned next to each other act as a wind shield for the photovoltaic solar panels and that may be beneficial in cold climate or very gusty wind conditions. In order to reduce a number of electrical generators, mechanical power transmission devices, such as a belt or gear drive, may be utilized. The shafts of turbine modules may be linked by a unified gear-transmission system to a common electrical generator, thereby increasing the assembly's electrical output while decreasing the assembly's construction and maintenance cost.

The combined electrical output generated by the solar panels producing electricity jointly or sequentially with the wind turbine electrical generators could be scaled up by the module extensions in various directions to augment electricity production and minimize the assembly's footprint. Some of the bases of module poles may house electrical generators, which receive the combined module shaft rotating output from a plurality of interconnected turbine modules.

Wind turbine modules 12, couplers 14 and couplers' joints 40 may be prefabricated at a manufacturing plant and transported in standard transportation containers, e.g. 8×8×20 ft. Modular assemblies may, be utilized as a standalone apparatus for small scale power generation, self-supporting power transmission lines installed along highways and railroads, or multi-level and multi-directional framework structures in combined wind-solar energy collecting and electrical power generating farms.

Figure 7A:
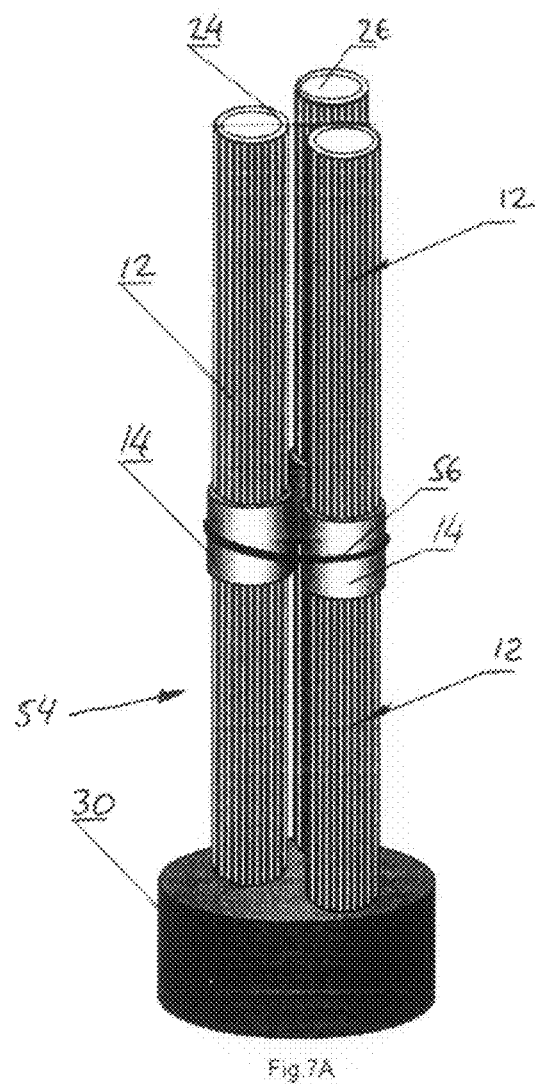
FIG. 7A is a 3-D view of a standalone modular assembly embodiment including a clamped cluster of three vertical modular wind turbine beams.
Figure 7B:
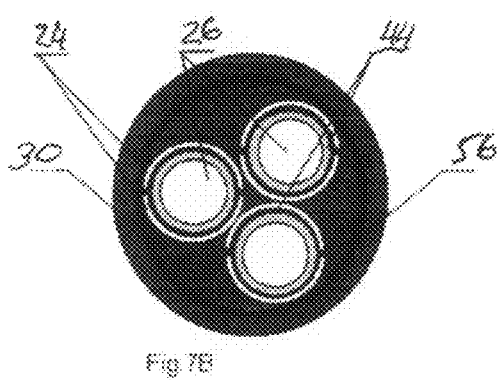
FIG. 7B is the top view of a cluster of three vertical poles of clamp-locked wind turbine modules.

A parallel module cluster 54 lends itself to greater stability and stiffness when poles or beams of integrated wind turbine modules are combined into a rigid cluster of 3, 5 or 7 module prongs. As shown in FIG. 7A and FIG. 7B, a stiff clamp 56 groups together three vertical poles of interlocked wind turbine modules into one cluster and such clusters 54 may have variable geometrical configurations. The clusters are operationally connected to one electrical generator 28 and rigidly affixed to and extend from the base functioning as an electrical generator housing 30.

In order to stabilize the modular assembly, the substantially horizontal photovoltaic solar panels are positioned at a level that is quite lower than the top of the modular wind turbine assembly poles 16 supporting the solar panels. Such positioning maximizes the assembly's output by increasing a solar panel sun exposure and wind exposure surfaces of the conjoined wind turbine modules. The standard modules could be easily transported to and assembled at the designated sites into variable height and width, angular beam light frame, operationally quiet structures requiring no towers or other independent support means, propellers, or large land areas.

The proposed invention is an improvement over the prior art because the subject modular wind-solar energy converting and structurally self-supporting assembly maximizes electrical output at a minimum cost, provides an expandable framework and footprint architecture, comprises stable and stiff wind turbine framework fitting the curvilinear or flat ground surface areas in many directions, operates in extreme climate conditions and fluctuating wind's velocity, provides a versatility of applications as standalone energy generators, extendable linear arrangement of the module beam framework, or wind-solar energy and electricity producing farms.

The foregoing description and drawings merely illustrate but not limit the invention except insofar as the amended claims are so limited. So those skilled in the art, who will have the disclosure before them, will be able to make modifications therein without departing from the scope of the invention.

What is claimed is:

1. A modular energy converting assembly comprising:
a tubular wind turbine module including a rotating shaft with equidistantly spaced blades rigidly affixed to said shaft;
a stationary sleeve encasing said rotating shaft with the attached blades;
said sleeve being coaxial with said shaft;
said blades radially and longitudinally extending from said shaft;
said sleeve comprising a series of equidistantly spaced jambs abutting top and bottom platforms;
a tubular coupler locking one said turbine module with another turbine module; and
said coupler integrating said platforms of the abutting turbine modules.

2. The modular assembly of claim 1, wherein
said blades spanning between the shaft ends;
said top platform linked to one of said shaft ends to prevent said shaft from oscillating.

3. The modular assembly of claim 1, and
a coupler joint comprising a plurality of angularly and operatively interconnected couplers to provide multidirectional and multi-angular connection of turbine modules.

4. The modular assembly of claim 1, and
said tubular coupler including at least one circular clamp and two half tubes.

5. The modular assembly of claim 1, and
said rotating shaft being coaxially connected with an electrical generator;
said generator encompassed by a generator housing;
said bottom platform rigidly secured to the electrical generator housing;
said generator housing supporting said shaft and the stationary sleeve.

6. A modular energy assembly comprising:
a tubular wind turbine module including a rotating shaft with equidistantly spaced blades rigidly affixed to said shaft;
a stationary sleeve encasing said rotating shaft with the attached blades;
said sleeve being coaxial with said shaft;
said blades radially and longitudinally extending from said shaft;

said sleeve comprising a series of equidistantly spaced jambs abutting top and bottom platforms;

said modules being interlocked together to form a modular pole;

a series of solar photovoltaic cell panels being attached to said wind turbine module pole;

said solar panels supported by frames detachably connected with said turbine module pole; and a series of the frame immobilizing brace cables attached to said module pole.

7. A modular energy generating assembly comprising:

a cluster of self-supporting wind turbine modules operatively and structurally connected to a single electric generator and extending from the electrical generator housing;

each module comprising a rotating shaft with longitudinally attached blades and a stationary sleeve coaxially encasing said shaft and comprising a series of jambs abutting the top and bottom plate platforms;

said extendable turbine modules clamped together into a multi-prong cluster to provide structural rigidity and small footprint for said turbine cluster;

said turbine module prongs in said cluster longitudinally interlocked by the abutting sleeve platforms of said modules.

8. The modular structure of claim 7, and said turbine module prongs clamped together at their base and merged with said generator housing.

9. A modular wind-solar energy converting assembly comprising:

an expandable framework of self-supporting wind turbine modules;

said framework comprising a plurality of vertical turbine module poles operatively and structurally interlinked by turbine module beams;

said module beams and poles angularly joined via module coupler joints;

said module poles connected to electrical generators.

10. A modular wind-solar energy converting assembly of claim 9, wherein said modular turbine poles coaxially mounted on respective electrical generators;

said beam linked poles forming a variable angle geometric footprint on the ground.

11. A modular wind-War energy converting assembly of claim 9, wherein a series of solar photovoltaic cell panels being attached to said wind turbine modules;

said panels being supported by the panel frames detachably attached to said turbine module poles.

12. A modular wind-solar energy converting assembly of claim 11, wherein solar panel frames supporting a series of parallel angularly positioned solar panels;

said solar panels positioned substantially horizontally on one level.

13. A modular wind-solar energy converting assembly of claim 11, wherein said framework having said panels occupying one level of the framework.

14. A modular wind-solar energy converting assembly of claim 9, wherein each of said turbine modules comprising a rotating shaft with longitudinally and radially attached blades;

a stationary sleeve encompassing said rotating shaft with secured blades and comprising a plurality of jambs rigidly affixed to top and bottom circular platforms.

15. A modular wind-solar energy converting assembly of claim 9, wherein module coupler joints detachably and angularly interlocking said modules.

16. A modular wind-solar energy converting assembly of claim 14, wherein said stationary jambs equidistantly and radially positioned along the rotating shaft axis.

* * * * *